United States Patent [19]

Swenson et al.

[11] 4,155,593

[45] May 22, 1979

[54] VEHICLE SEAT HAVING SEAT RAKE ADJUSTMENT MEANS

[75] Inventors: Richard F. Swenson, Milwaukee; Shawn H. Eimen, Menomonee Falls, both of Wis.

[73] Assignee: Milsco Manufacturing Company, Brown Deer, Wis.

[21] Appl. No.: 888,483

[22] Filed: Mar. 20, 1978

[51] Int. Cl.² ............................................... A47C 7/02
[52] U.S. Cl. ..................................... 297/284; 297/349
[58] Field of Search ............... 297/284, 313, 361, 328; 248/371, 397

[56] References Cited

U.S. PATENT DOCUMENTS

| | | | |
|---|---|---|---|
| 2,050,420 | 8/1936 | Brobst | 248/397 |
| 2,638,150 | 5/1953 | May | 297/313 |
| 3,336,079 | 8/1967 | Radke et al. | 297/361 X |
| 3,587,569 | 6/1971 | Madsen | 297/284 |
| 3,883,173 | 5/1975 | Shephard et al. | 297/284 |

Primary Examiner—Francis K. Zugel
Attorney, Agent, or Firm—James E. Nilles

[57] ABSTRACT

A vehicle seat comprises a seat assembly including a seat pan and a foam rubber block overlying the seat pan. Seat rake adjustment means are provided to vertically adjust (raise and lower) the forward part of the foam rubber block and comprises: a rake adjustment plate located between the forward part of the seat pan and the foam rubber block, a hinge connecting the rear of the rake adjustment plate to the seat pan, a flange plate connected to and extending downwardly from the rake adjustment plate through a slot in the seat pan, a pair of parallel serrated diagonal slots in the flange plate, and a horizontally shiftable lever at the front edge of the seat pan having a pair of pins which extend through the slots and rest on the seat pan and serve to raise and lower the rake adjustment plate as the lever is shifted.

3 Claims, 12 Drawing Figures

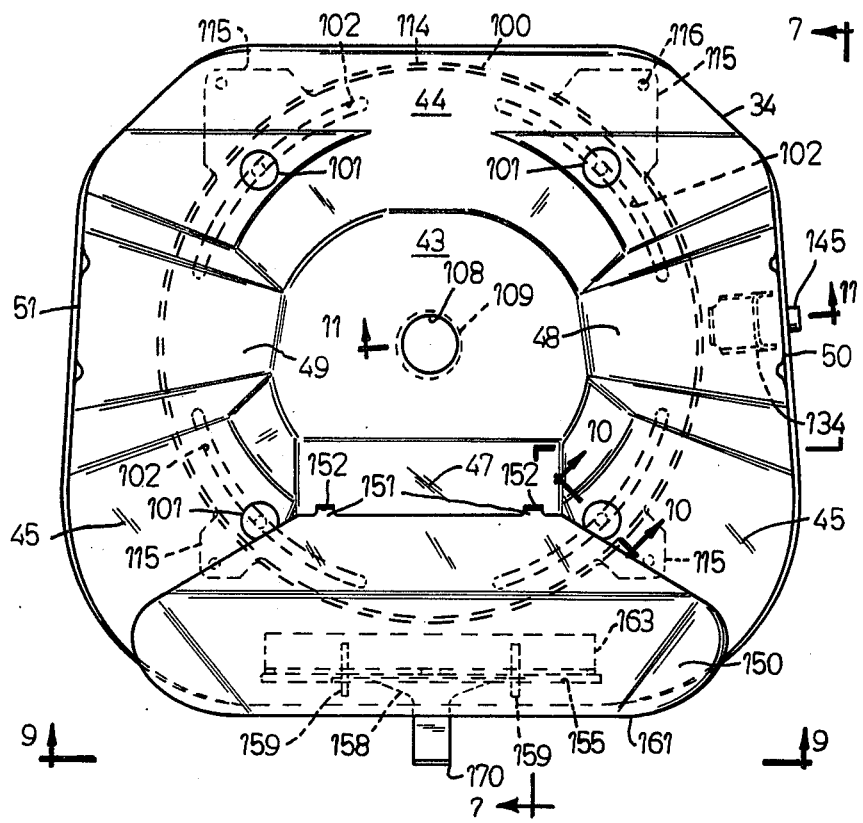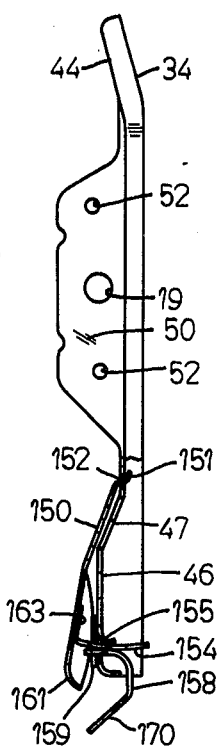
FIG. 6
FIG. 7
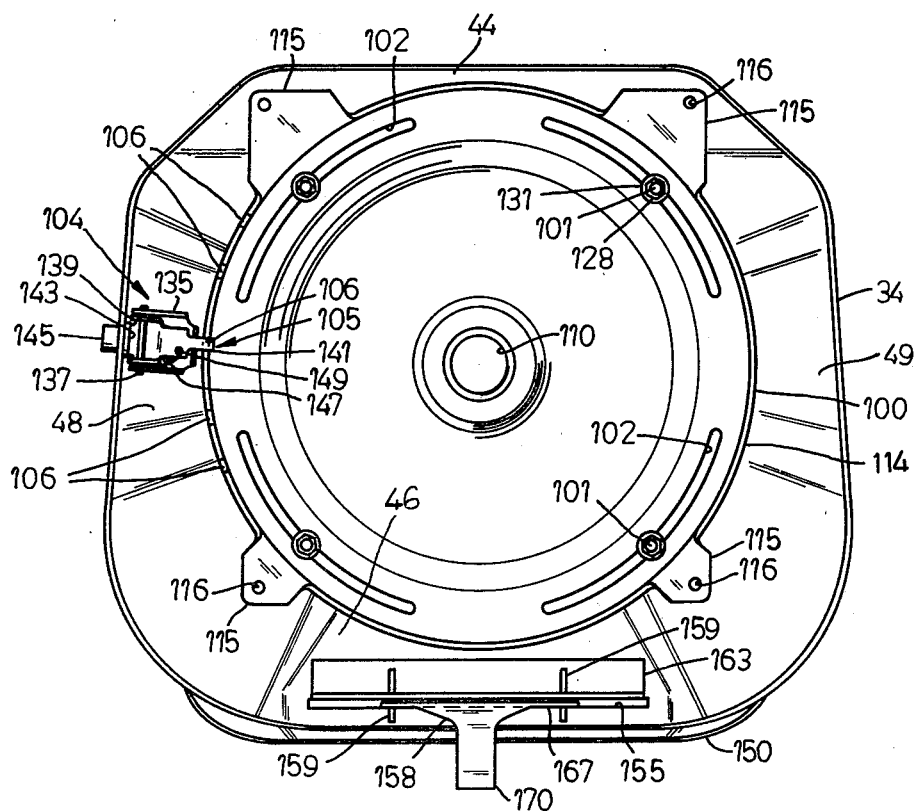
FIG. 5

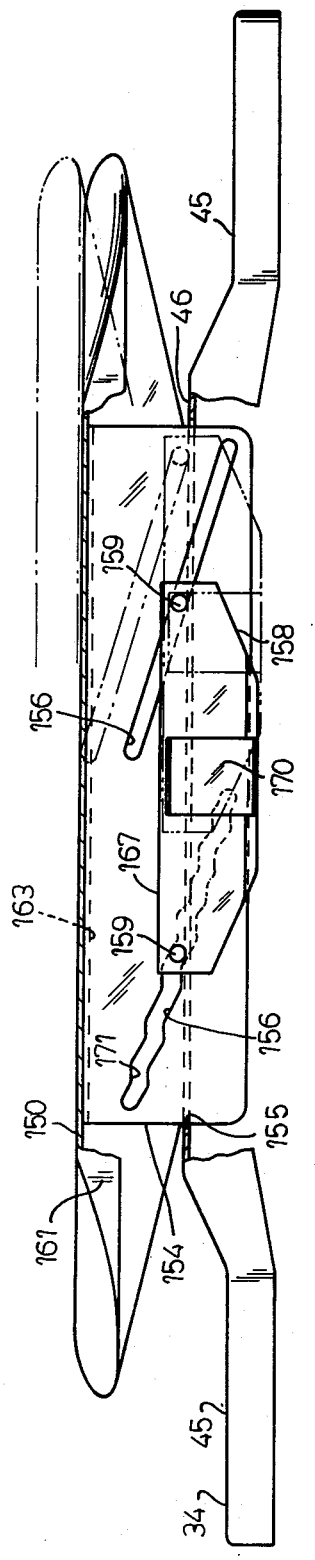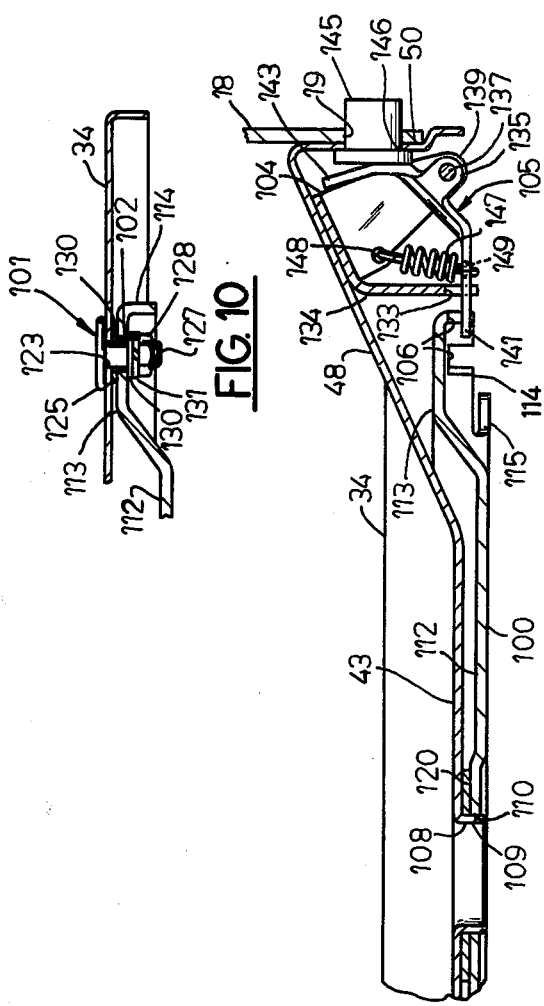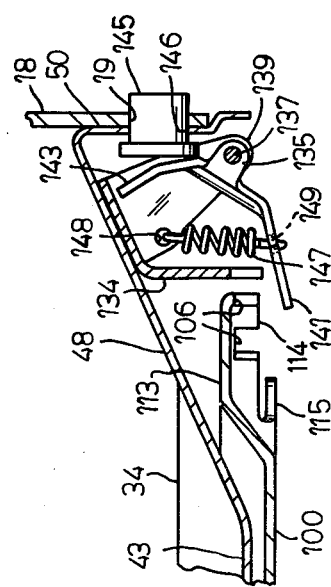

1

VEHICLE SEAT HAVING SEAT RAKE ADJUSTMENT MEANS

BACKGROUND OF THE INVENTION

1. Field of Use

This invention relates generally to vehicle seats such as are used as driver's or operator's seats on vehicles such as farm tractors, construction machines or the like. In particular, it relates to vehicle seats having seat rake adjustment means for raising or lowering the front edge of the seat.

2. Description of the Prior Art

Some vehicle seats comprise a seat assembly and an attached backrest assembly and are constructed so as to be mountable either on the floor or on a floor-mounted pedestal in the driver's compartment or station on the vehicle. Heretofore, the top of the seat assembly was either at a fixed height from the floor or could be raised or lowered by raising or lowering the entire seat assembly. It is desirable, however, from the standpoint of the operator's comfort or convenience or to avoid fatigue to be able to raise or lower the front portion of the top of the seat assembly of the vehicle seat, regardless of whether or not the entire seat assembly can be raised or lowered. Some prior art vehicle seats are of such specialized construction that they do not lend themselves to construction or conversion so as to provide such a feature.

SUMMARY OF THE INVENTION

In accordance with the invention, there is provided a vehicle seat which comprises a seat assembly including a seat pan and a layer or block of resilient foam-like material overlying the seat pan. Seat rake adjustment means are provided at the forward part of the seat assembly to vertically adjust (raise and lower) the height of the forward part of the layer of resilient material and comprises: a rake adjustment plate disposed between the seat pan and the layer of resilient material at the forward part of the seat, a hinge assembly for pivotally connecting the rear of the rake adjustment plate to the seat pan whereby the plate can pivot up or down, a flange plate connected near the forward part of the rake adjustment plate and extending downwardly therefrom through a slot in the seat pan, a pair of parallel, preferably serrated sloped or diagonal adjustment slots in the flange plate, and a horizontally shiftable lever plate at the front edge of the seat pan having a pair of spaced apart pins which extend into the adjacent slots and rest on the seat pan to raise and lower the rake adjustment plate as the lever plate is shifted.

Seat rake adjustment means in accordance with the invention are adaptable for use with various types of seat assemblies, are relatively economical and easy to fabricate, and use a minimum number of components.

Other objects and advantages of the invention will hereinafter appear.

BRIEF DESCRIPTION OF THE DRAWINGS

FIG. 5 is a bottom plan view of the vehicle seat shown in FIGS. 1-4;

FIG. 6 is a top plan view of the seat pan shown in FIG. 5;

FIG. 7 is a side elevational view partly in cross section taken on line 7—7 of FIG. 6;

FIG. 9 is a front view partly in cross section taken on line 9—9 of FIG. 6;

FIG. 10 is a cross-sectional view taken on line 10—10 of FIG. 6;

FIG. 11 is a cross-sectional view taken on line 11—11 of FIG. 6; and

FIG. 12 is a view similar to FIG. 11 but showing the latch member in an alternate position.

DESCRIPTION OF A PREFERRED EMBODIMENT

General Arrangement

Figure 1:
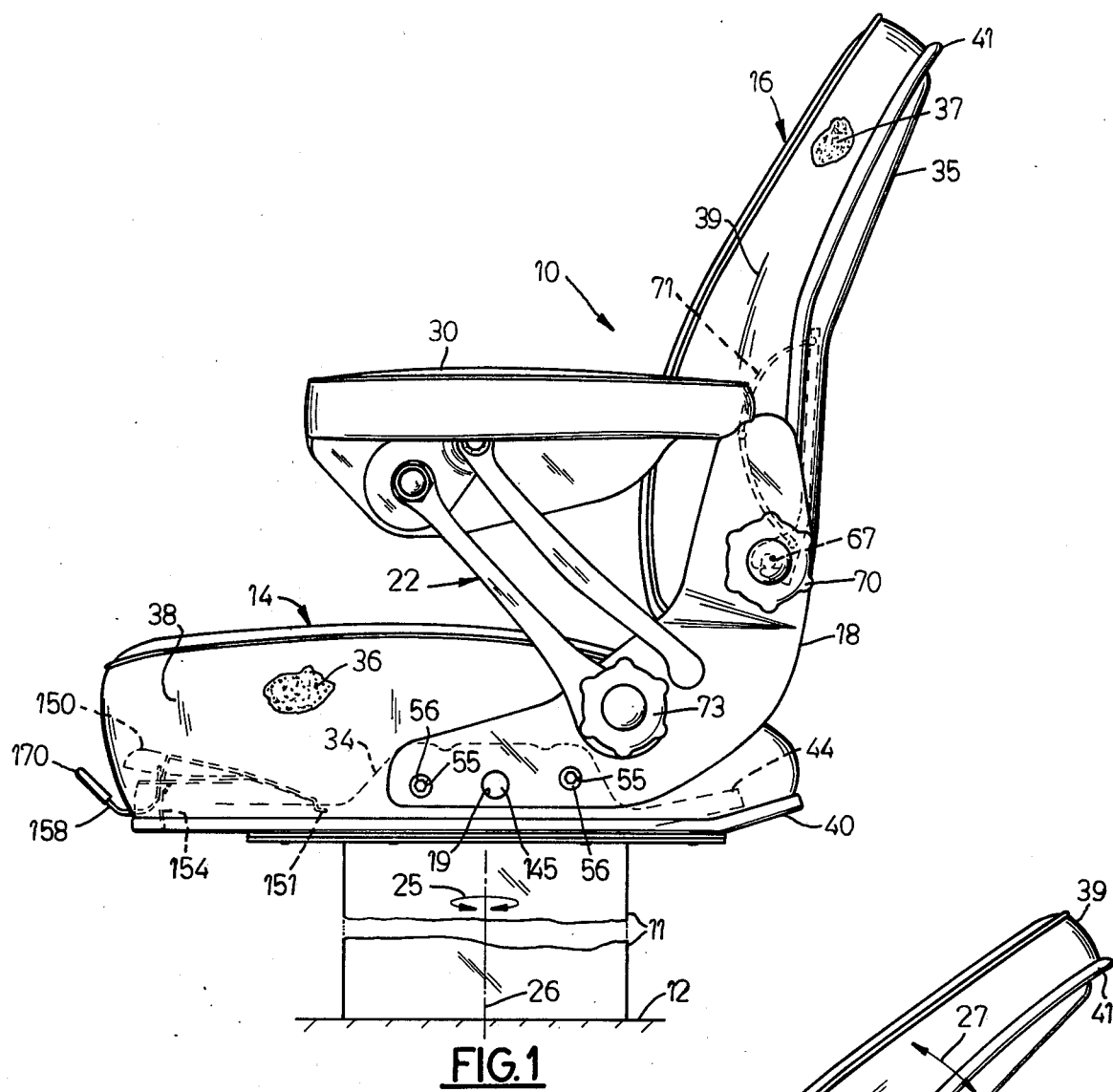
FIG. 1 is a side elevational view of a vehicle seat in accordance with the invention showing the backrest in upright position and the arm rests in upright position.

FIGS. 1, 2, 3, and 4 show a vehicle seat 10 in accordance with the invention mounted on a pedestal 11 (FIG. 1) which, in turn, is mounted on the floor 12 of a vehicle such as a tractor, construction machine, or the like. In the following description, the terms "left" and "right" refer to the left and right sides of the vehicle seat relative to the occupant of the seat, unless otherwise noted, and regardless of orientation of a component in a particular drawing figure.

Seat 10 comprises a seat assembly 14, a backrest assembly 16 connected to the seat assembly by a pair of stamped sheet metal L-shaped connector plates 18 (left) and 20 (right), and a pair of independently operable arm rest assemblies 22 (left) and 24 (right) connected to the connector plates 18 and 20, respectively.

Figure 2:
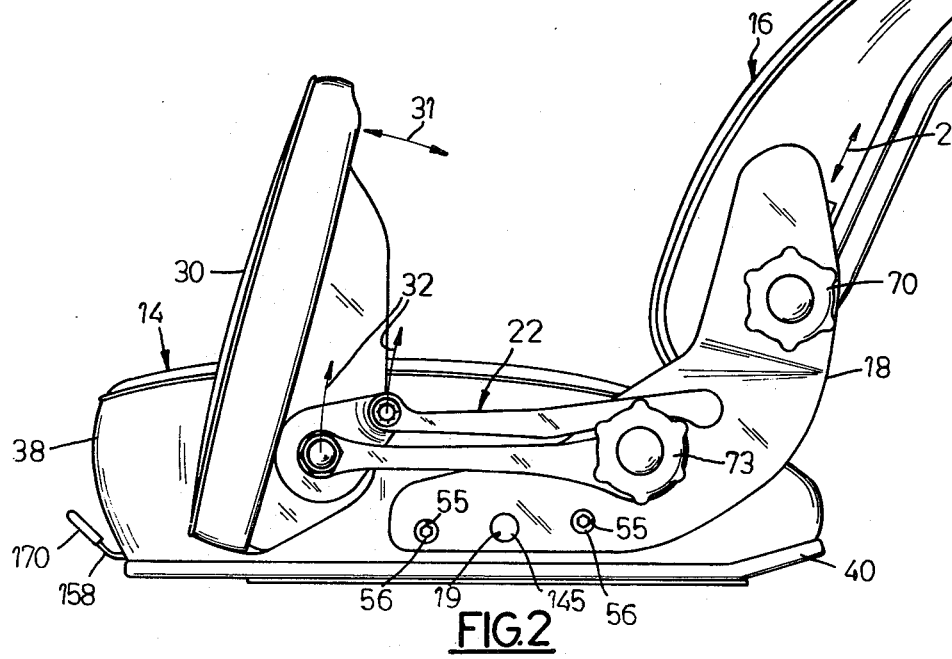
FIG. 2 is a view similar to FIG. 1 but showing the backrest tilted rearwardly and the arm rest positioned forwardly and rotated forwardly.
Figure 3:
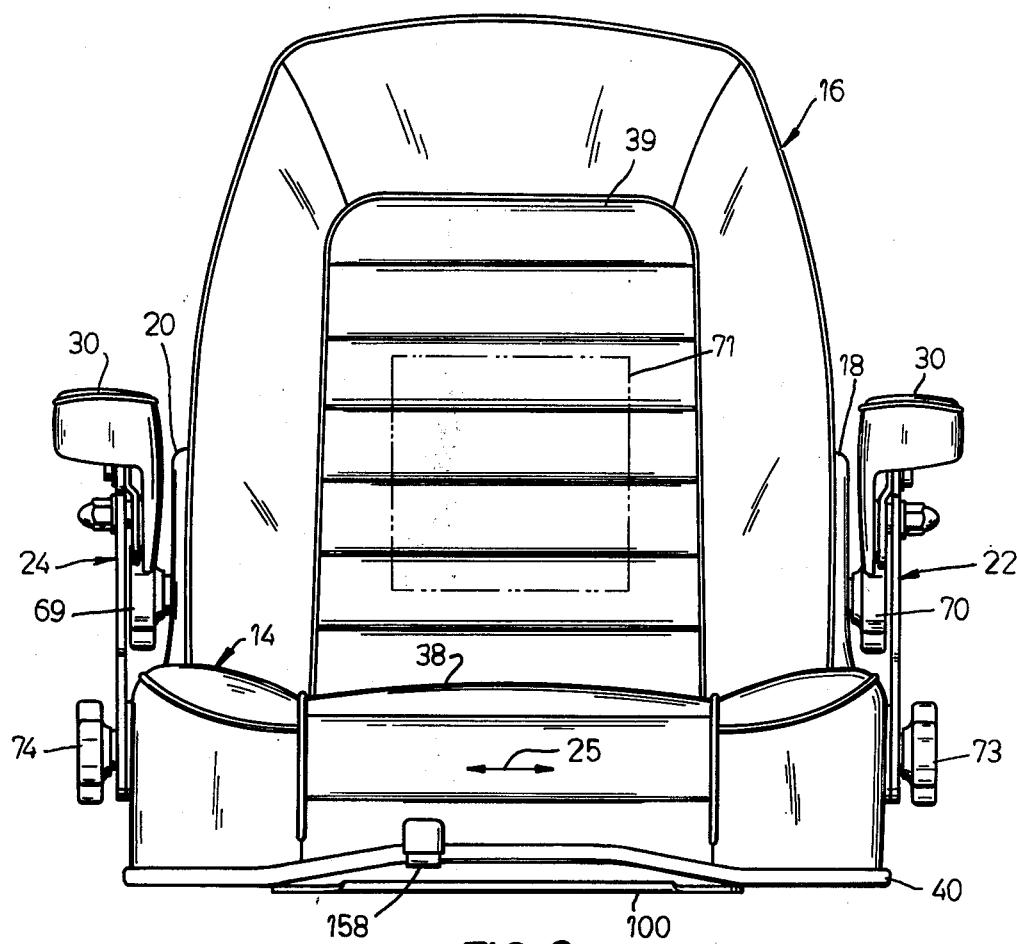
FIG. 3 is a front elevational view of the vehicle seat shown in FIG. 1.

Seat 10 can swivel 30° right or left for a total of 60° in the direction of the arrow 25 (FIG. 1) about a vertical axis 26 with respect to pedestal 11. Backrest assembly 16 can be tilted forward or rearward to a limited degree (about 28° total travel from the vertical in one direction) in the direction of the arrow 27 (FIG. 2) and can also be raised or lowered in the direction of the arrow 28 (FIG. 2) with respect to seat assembly 14. The arm rest 30 of each arm rest assembly 22, 24 is rotatable in a vertical plane in the direction of arrow 31 (FIG. 2) and is also shiftable upwardly and downwardly in the vertical plane in the direction of the arrows 32 (FIG. 2), as comparison of FIGS. 1 and 2 shows.

As FIGS. 1-8 show, seat assembly 14 and backrest assembly 16 generally comprise rigid stamped sheet metal frames or pans 34 and 35, respectively, shaped or contoured layers or blocks 36 and 37, respectively, of resilient compressible material, such as foam or sponge rubber or the like, for disposition on the respective pans, flexible exterior upholstery covers 38 and 39, respectively, of vinyl or the like overlying and adhering to the blocks 36 and 37, respectively, and metal edging of finishing strips 40 and 41, respectively.

As FIGS. 5, 6, and 7 best show, seat pan 34, which is generally rectangular around its periphery, comprises a downwardly concave circular central portion 43, a flat upwardly sloped rear portion 44, flat forward portions 45, a flat raised forward portion 46 having a downwardly sloped adjacent portion 47, and upwardly sloped side portions, left and right side portions 48 and 49, respectively, which terminate in integrally formed downwardly depending left and right side plates 50 and 51, respectively. Each side plate 50 and 51 is provided with a pair of spaced apart mounting holes 52.

As FIGS. 1, 2, 3, and 4 show, each connector plate 18 and 20 comprises a pair of spaced apart mounting holes 55 in its lower leg for accommodating mounting bolts 56 which extend therethrough and through the threaded mounting holes 52 in the seat pan side plates 50 and 51 to rigidly secure the connector plates 18 and 20 to the seat pan 34.

Figure 4:
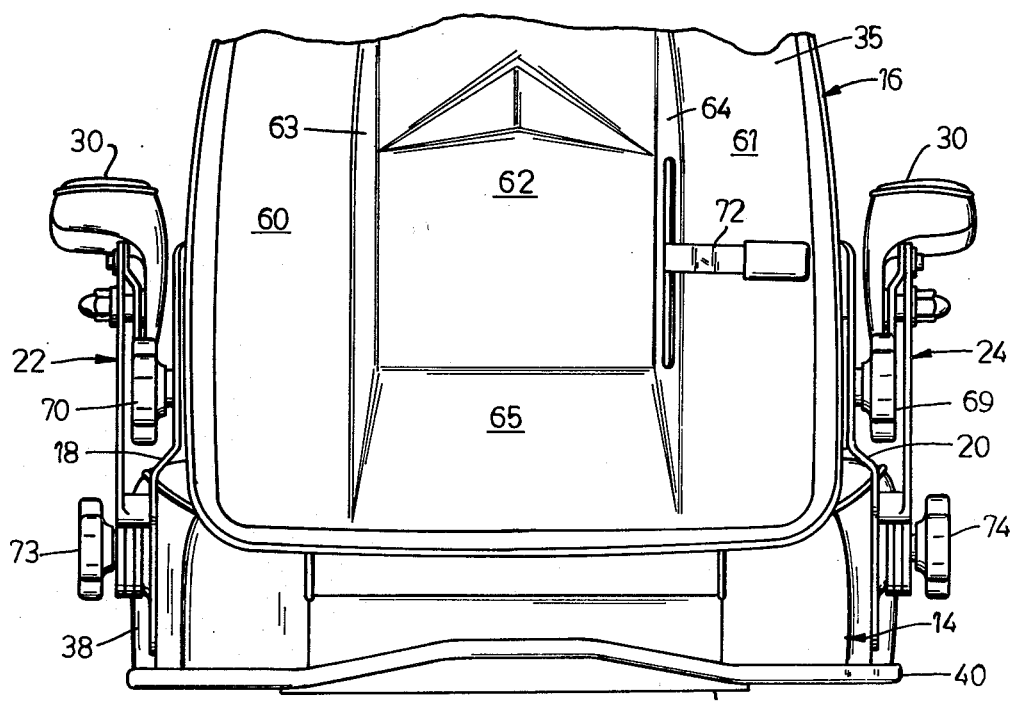
FIG. 4 is a rear elevational view of the vehicle seat shown in FIG. 1.
Figure 8:
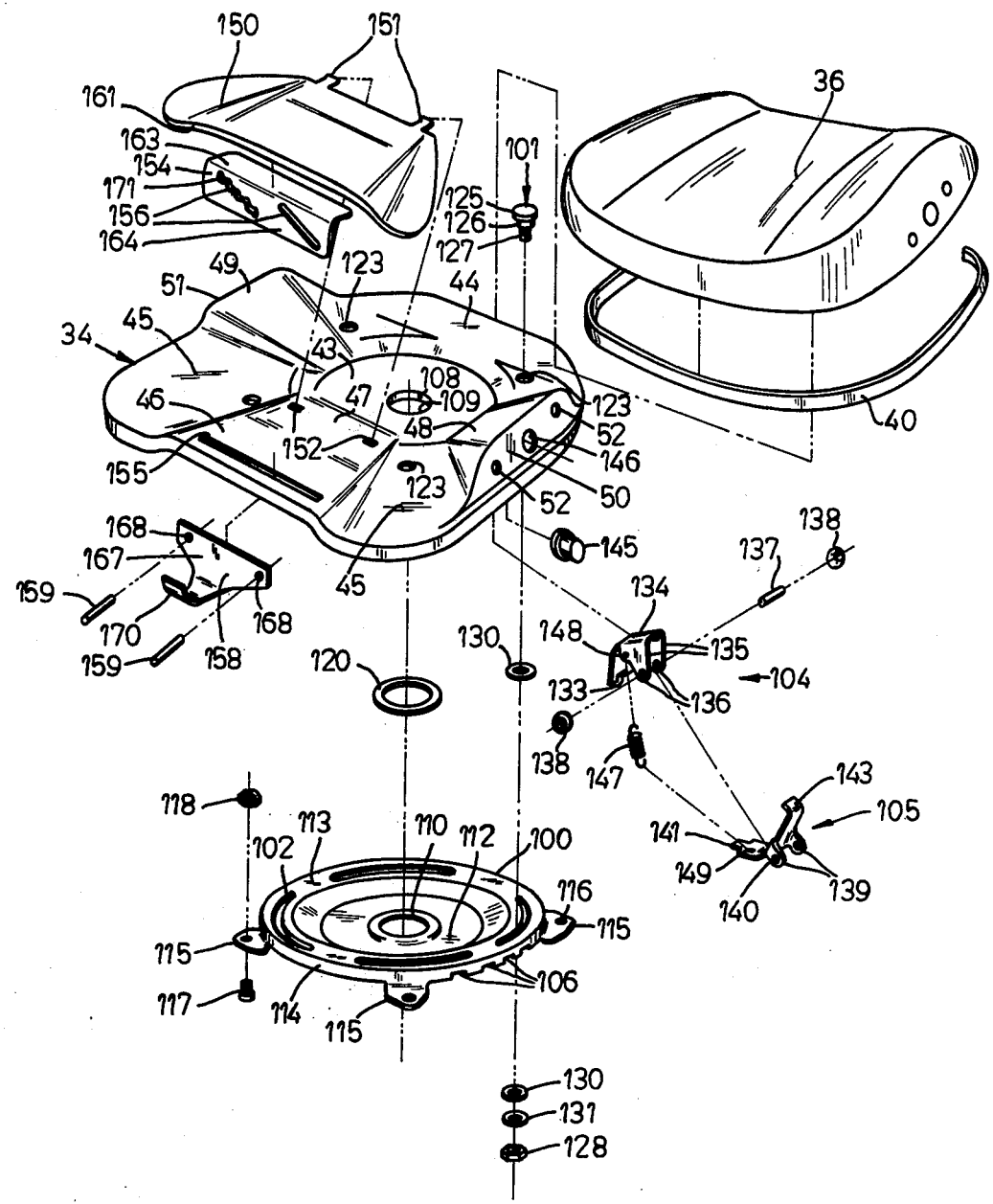
FIG. 8 is a exploded view of the seat assembly of the vehicle seat shown in FIGS. 1-7.

As FIG. 4 shows, backrest pan 35, which is generally rectangular around its periphery, comprises spaced apart slightly rearwardly curved left and right side portions 60 and 61, respectively, and a rearwardly concave rectangular central portion 62 which is bounded on its left and right edges by rearwardly sloped side portions 63 and 64, respectively, and a rearwardly sloped bottom portion 65.

The connector plates 18 and 20 have holes 67 and 68, respectively, near the upper ends thereof for control components associated with the backrest tilt adjustment means and the backrest vertical (height) adjustment means, respectively. Means are provided to connect and support the backrest assembly 16 to the connector plates 18 and 20 of the seat assembly 14 and also to enable the backrest assembly to be raised and lowered vertically to various positions and to be tilted forwardly and rearwardly to various positions relative to the seat assembly. Such means includes a height adjustment knob 69 and a tilt adjustment knob 70. Means, including a control lever 72, are also provided in the backrest assembly 16 to horizontally adjust lumbar support 71 embodied therein. The backrest tilt adjustment means, the backrest vertical adjustment means, and the lumbar support adjustment means employ or embody various common elements or components. Means, including arm rest adjustment knobs 73 and 74, are provided in the arm rest assemblies 22 and 24, respectively.

Adjustable Swivel Mounting Means

As FIGS. 5, 6, 7, 8, 10, 11, and plate show, vehicle seat 10 comprises seat assembly 14 which includes seat pan 34 and adjustable swivel mounting means are connected to the seat pan whereby vehicle seat 10 is connected to and supported on pedestal 11 in such a manner that vehicle seat 10 can swivel or rotate to a limited degree in either direction about vertical axis 11 with respect to the pedestal to various positions wherein it can be releasably locked or latched. The adjustable swivel mounting means generally includes: a swivel plate 100 below and rotatably connected to the seat pan 34, means on the swivel late for connection to the pedestal, stop members or guide bolts 101 on the seat pan engageable with arcuate slots 102 in the swivel plate to hold down and to limit seat rotation, and a latch mechanism 104 on the seat pan having a latch member 105 releasably engageable with positioning notches 106 on the swivel plate to lock the vehicle seat in various positions.

Thus, downwardly concave portion 43 of seat pan 34 has a central opening 108 therethrough defined by a downwardly extending cylindrical flange or boss 109 which extends through a central circular opening 110 in generally circular swivel plate 100 which is located beneath seat pan 34. Swivel plate 100 has a downwardly concave central portion 112, a flat circular peripheral portion 113, and a downwardly extending peripheral flange 114. Swivel plate 100 also has four integrally formed outwardly projecting, downwardly displaced flanges 115, each having bolt hole 116 therethrough for a bolt 117 and weld nut 118, which serve as the means whereby it can be rigidly attached or bolted to pedestal 11. A central spacer washer 120 is located on boss 109 between seat pan 34 and swivel plate 100. The flat portion 113 of swivel plate 100 has four angularly and equidistantly spaced apart arcuately-shaped, bolt-receiving guide slots 102 therethrough for receiving the guide bolts 101 which extend downwardly through four angularly and equidistantly spaced apart bolt holes 123 provided in seat pan 34. Each bolt 101 comprises a relatively large flat head 125, an unthreaded shank 126 in hole 123, a threaded end 127 in slot 102 for receiving a nut 128. Shank 126 serves as a spacer or bushing and is disposed between pan 34 and plate 100. Flat washers 130 are disposed on opposite sides of plate 100 and a lock washer 131 is located between nut 128 and lower washer 130. The arrangement thus far described enables seat pan 34 (and thus vehicle seat 10) to be swivelled 30° in either direction for a total angular distance in either direction of about 60° relative to the pedestal 11 when plate 100 is attached to the pedestal.

Latch means are provided to lock or latch seat 34 (and thus vehicle seat 10) in various positions to which it has been swivelled and comprise a plurality (four) of spaced apart notches 106 in peripheral flange 114 of swivel plate 100 on one (left) side thereof. The latch mechanism 104 is mounted beneath upraised portion 48 on the left side of seat pan 34 and comprises a support bracket 134 which is rigidly attached or welded to the seat pan and which has downwardly depending spaced apart legs 135, each having a pin-receiving hole 136 therein, for accommodating a pivot pin 137 which is secured against axial displacement by press-on washers 138 at each end thereof. Pin 137 pivotally supports latch member 105 which has downwardly depending spaced apart ears 139, each having a pin-receiving hole 140 therethrough, a downwardly extending lower arm 141 for engagement with any one of the plurality of positioning notches 106 in the swivel plate 100. Arm 141 engages a slot 133 in bracket 134 to prevent lateral movement of arm 141 and to prevent rotation of the seat pan. Latch member 105 has an upwardly extending upper arm 143 for engagement by a latch-release pushbutton 145 which is supported in a hole 146 in side plate 50 forming part of seat pan 34. A helical-type tension spring 147 has one end secured in a hole 148 in a leg 135 of support bracket 134 and has its other end secured in a hole 149 in lower arm 141 of latch member 105. Spring 147 biases the latch member 105 upward (clockwise in FIG. 11) so that its lower arm 141 engages a notch 106 in the swivel plate 100 and so that its upper arm 143 forces pushbutton 145 outwardly. When pushbutton 145 is depressed inwardly by a seat occupant, latch member 105 pivots (counterclockwise in FIG. 12) and disengages a notch 106, thereby enabling vehicle seat 10 to be rotated to another position wherein it can be relatched.

Seat Rake Adjustment Means

As FIGS. 5, 6, 7, 8, and 9 show, vehicle seat 10 comprises seat assembly 14 which includes seat pan 34 and foam rubber block 36 overlying the seat pan. Seat rake adjustment means are provided to vertically adjust (raise and lower) the forward part of the foam rubber block 36. The seat rake adjustment means generally comprises: a rake adjustment plate 150 located between the forward part of the seat pan 34 and the foam rubber block 36, a hinge means, including porjections 151 and holes 152, connecting the rear of the rake adjustment plate to the seat pan, a flange plate 154 connected to and extending downwardly from the rake adjustment plate through a slot 155 in the seat pan, a pair of parallel serrated diagonal slots 156 in the flange plate, and a horizontally shiftable lever 158 at the front edge of the seat pan having a pair of pins 159 which extend through the slots 156 and rest on the seat pan 34 and serve to raise and lower the rake adjustment plate 150 as the lever 158 is shifted.

Thus, as hereinbefore explained, seat pan 34 has a flat horizontal raised forward portion 46 and an adjacent rearwardly inclined or sloped rear portion 47 located between the forward edge and the concave portion 43 of the seat pan. Raised portion 46 has elongated slots 155 therein running generally parallel to the forward edge of the seat pan 34 and rear sloped portion 47 has the pair of laterally spaced apart short slots 152 therein adjacent the edge of concave portion 43. Seat rake adjustment plate 150, which has a downwardly curved flange 161 along its forward and side edges to prevent damage to the flexible block 36, also has the pair of spaced apart downwardly and rearwardly slot engagement tabs 151 at its rear edge. Plate 150 is located above the portions 46 and 47 of seat pan 34 and below the forward part of the block 36 of resilient material of seat assembly 14. The tabs 151 of rake adjustment plate 150 engage the slots 152 in seat pan 34 and serve as a hinge means whereby and about which plate 150 can be raised or lowered slightly (pivoted clockwise or counterclockwise, respectively, in FIG. 7) to effect corresponding raising or lowering of the upper front edge of seat assembly 14. Rake adjustment plate 150 is bent slightly so that the rear portion thereof rests on and is supported by inclined portion 47 of seat pan 34 when the adjustment plate is in fully lowered position. Means are provided to raise and lower rake adjustment plate 150. Thus, flange plate 154 of generally L-shaped cross section, and including a horizontal portion 163 which is welded to the underside of the plate 150 near the forward edge thereof and vertically depending portion 164 which extends downwardly through elongated slot 155 in seat pan 34, has the pair of spaced apart sloped or diagonal pin-receiving adjustment slots 156 therein, at least one of which is preferably serrated or stepped as shown, which are parallel to each other.

Lever plate 158, which has a generally flat portion 167 with a pair of laterally spaced apart pin-receiving holes 168 therein which the rearwardly extending lift pins 159 are rigidly secured as by welding, extends upwardly through elongated slot 155 in seat pan 34. The lift pins 159 extend through the sloped adjustment slots 156 in flange plate 154 and also rest on the flat raised portion 46 of seat pan 34. Lever plate 158 is provided with an integrally formed forwardly and upwardly extending operating lever 170 whereby the lever plate 158 can be moved or slid horizontally left or right. As such movement occurs, the lift pins 159 cooperate with the sloped adjustment slots 156 to cause flange plate 154 and the rake adjustment plate 150 attached thereto to be pivotally raised or lowered, depending on the direction and extent of horizontal movement of the lever plate 158. The serrations or steps 171 in at least one of the slots 156 prevent slippage of the associated pin 159 along the slot and ensure that the rake adjustment plate 150 is maintained at the desired elevation. The load imposed by the weight of the operator on seat assembly 14 is transferred through resilient block 36 to the rake adjustment plate 150, through flange plate 154, and through the pins 159 to the seat pan 34.

As is apparent, the adjustable swivel mounting means and the seat rake adjustment means, although employing some common elements of seat assembly 14 of vehicle seat 10, do not physically or functionally interfere with each other and are each independently operable, regardless of the operation or position of the other.

We claim:

1. In a vehicle seat:

a seat assembly including a seat pan having a slot;

a seat rake adjustment plate located above said seat pan;

hinge means for pivotally connecting said rake adjustment plate to said seat pan whereby said rake adjustment plate can be raised and lowered relative to said seat pan;

a flange member extending downwardly from said rake adjustment plate and through said slot, said flange member having at least one elongated serrated slot therein disposed at an angle to said seat pan;

a lever having a portion extending through said slot and shiftable therealong;

and a pin connected to said lever above said seat pan and extending through said one elongated serrated slot in said flange member, said pin being supported by said seat pan and engageable with an edge of said elongated serrated slot to support said seat rake adjustment plate, whereby shifting of said lever and the pin attached thereto causes said flange member and the rake adjustment plate attached thereto to be raised or lowered relative to said seat pan.

2. A vehicle seat according to claim 1 wherein said flange member has at least two spaced apart parallel elongated slots, at least one of which is serrated, disposed at an angle to said seat pan and wherein at least two spaced apart pins are connected to said lever for engagement with said elongated slots.

3. A vehicle seat according to claim 1 wherein said hinge means comprises at least one hole in one of said seat pan or said seat rake adjustment plate and a projection on one of said seat pan or said seat rake adjustment plate for engagement with said one hole.

* * * * *